US006428726B1

(12) United States Patent
Pribyl

(10) Patent No.: US 6,428,726 B1
(45) Date of Patent: Aug. 6, 2002

(54) METHOD FOR CONSTRUCTING BLOCK FOR STAIRCASE

(75) Inventor: Gary F. Pribyl, Cedar Rapids, IA (US)

(73) Assignee: King's Material, Inc., Cedar Rapids, IA (US)

(*) Notice: Subject to any disclaimer, the term of this patent is extended or adjusted under 35 U.S.C. 154(b) by 0 days.

(21) Appl. No.: 09/440,405

(22) Filed: Nov. 15, 1999

(51) Int. Cl.$^{7}$ .......................... B28B 1/08; B29C 71/00

(52) U.S. Cl. .......................................... 264/71; 264/234

(58) Field of Search ..................... 264/71, 234; 52/182, 52/189, 606, 607

(56) References Cited

U.S. PATENT DOCUMENTS 2,172,051 A 9/1939 Robbins
4,261,693 A * 4/1981 Rayner et al. .............. 425/431
4,802,320 A * 2/1989 Forsberg ...................... 52/585
5,062,610 A 11/1991 Woodford et al. ............ 249/52
5,409,325 A 4/1995 Wu ............................. 404/34
5,479,746 A 1/1996 Mannonen ................... 52/182
5,589,124 A 12/1996 Woodford et al. .......... 264/157
5,620,283 A 4/1997 Walter ........................ 405/286
D384,168 S 9/1997 Stevenson
5,678,958 A 10/1997 Rossi ......................... 405/286

OTHER PUBLICATIONS

Borgert Products, Inc. advertising entitled "Steps Made Easy! With Stair Stackers" Borgert Products, Inc., P.O. Box 39, St. Joseph, Minnesota 56374 May 1999.

Decor Innovative Concrete Systems—"Step Stacker" brochure. Decor 682 Arvin Avenue, Stony Creek, Ontario, Canada L8E5R4.

* cited by examiner

*Primary Examiner*—Christopher A. Fiorilla
(74) *Attorney, Agent, or Firm*—Allan L. Harms

(57) ABSTRACT

A method for molding a block for an outdoor staircase stair includes filling a form with zero slump mix, the form having outer walls and a core member which includes a vertically disposed central recess extending into the core from its lower surface, filling the recess in the core member, agitating the filled form and recess, compressing the top of the mix in the form, passing a compression head through the form to transfer the formed mix to a pallet, and then curing the formed mix in a misting kiln.

27 Claims, 5 Drawing Sheets

METHOD FOR CONSTRUCTING BLOCK FOR STAIRCASE

BACKGROUND OF THE INVENTION

The present invention relates to stairway components used in landscaping. Current methods of creating stairs in outdoor settings include the use of landscape timbers, casting of concrete forms in place, or precasting concrete, or by the use of bricks, paving blocks or concrete slabs arranged to serve as stair components. Each of these methods is very labor intensive and is susceptible to large variations in result. One effort to provide prefabricated concrete stair components is disclosed in U. S. Pat. No. 5,479,746. The devices of this patent include an assortment of components which are stacked to create various stairway or platform arrangements. An open-centered elongate block used to receive individual rectangular blocks is offered for sale under the name STAIR STACKER™ by Borgert Products, Inc. and STEP STACKER by Decor Innovative Concrete Systems. This product does not provide any stabilization of the sides of the open block and features a flat face which does not blend with surrounding components of a block retaining wall. Due to the open structure of this prior art stair block, dimensions may vary caused by the lack of predictable spacing between the longer walls during curing of the concrete within the block forms.

SUMMARY OF THE INVENTION

A stair component block constructed of zero slump concrete is formed with a hollow center section surrounded by orthogonal upright walls. Two opposing walls are interconnected with a narrow vertical web which is provided with two or three vertical slots extending from its top edge toward generally the center of the web. Additional vertical slots are formed in the web at the intersections of the web and the opposing walls interconnected by the web. Each of these slots extends from the top edge of the web part way to the bottom of the web. The web is so slotted such that the top part of the web may be easily removed by striking the sides of the top of the web after the block has been placed. The broken pieces of the web can be left within the central opening of the block during installation. The block is then partly filled with compacted granular material with a covering layer of sand up to a level below the block's top edges equal to the thickness of paving blocks or bricks to be placed atop the sand layer. Paving blocks or paving bricks may then be placed within the block above the sand in varying arrangements according to the installer's choice of design. The paving blocks are set such that the tops thereof are generally flush with the tops of the outer walls of the stair block.

The outside vertical corners of the blocks are beveled and the outside faces of the vertical walls are formed with vertical grooves formed therein spaced such that seams between adjoining blocks will appear to be part of a continuous wall. The inner and outer corners of the tops of the upright walls are radiused to provide a rounded step surface for the stair user and to blend and match with the corners of the usual paving block to be installed within the opening of the block. The blocks may be formed of dyed concrete in any of many colors as desired.

It is an object of the invention to provide a stair component for landscaping applications which is factory produced at low cost and high efficiency.

It is a further object to provide an easily installed stairway block which can be used to retain paving blocks in its top section to provide a decorative staircase in landscaping applications.

It is a further object to provide a stairway block which is easily handled by the installer.

It is also an object of the invention to provide a stair block which is stabilized during installation with a transverse stabilizing web.

It is a further object to provide a stairway block which is aesthetically compatible with retaining walls made from blocks.

It is also an object of the invention to provide a stairway block which is easy to use and which may be successfully installed on a "do-it-yourself" basis.

It is also an object of the invention to provide a landscaping stair block with rounded upper corners.

It is further an object of the invention to produce a landscaping stair block which is versatile in arrangement while having an easily removable stabilizing web.

These and other objects of the invention will be understood from examination of the accompanying drawings and the detailed description which follows.

DESCRIPTION OF THE DRAWING FIGURES

DETAILED DESCRIPTION OF THE INVENTION

Figure 1:
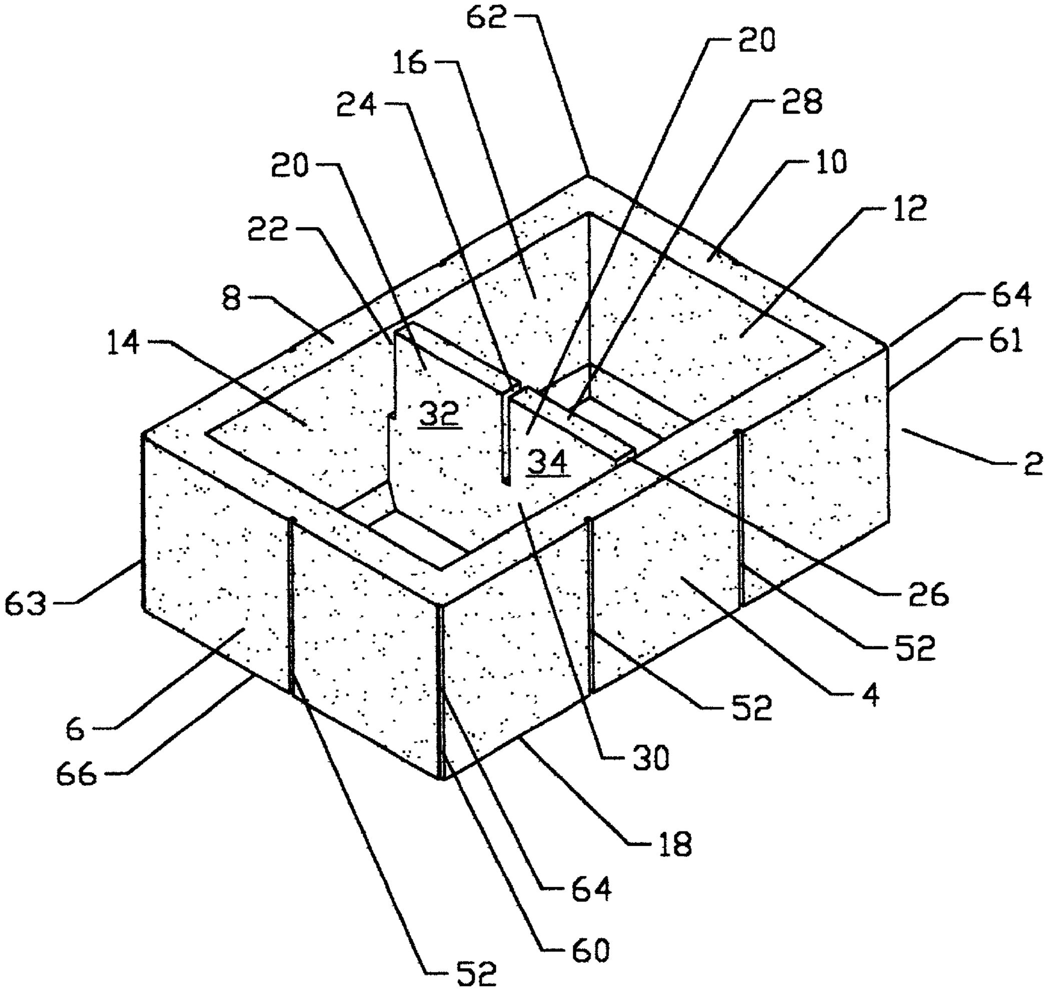
FIG. 1 is a front left perspective of the stair block according to the present invention.
Figure 2:
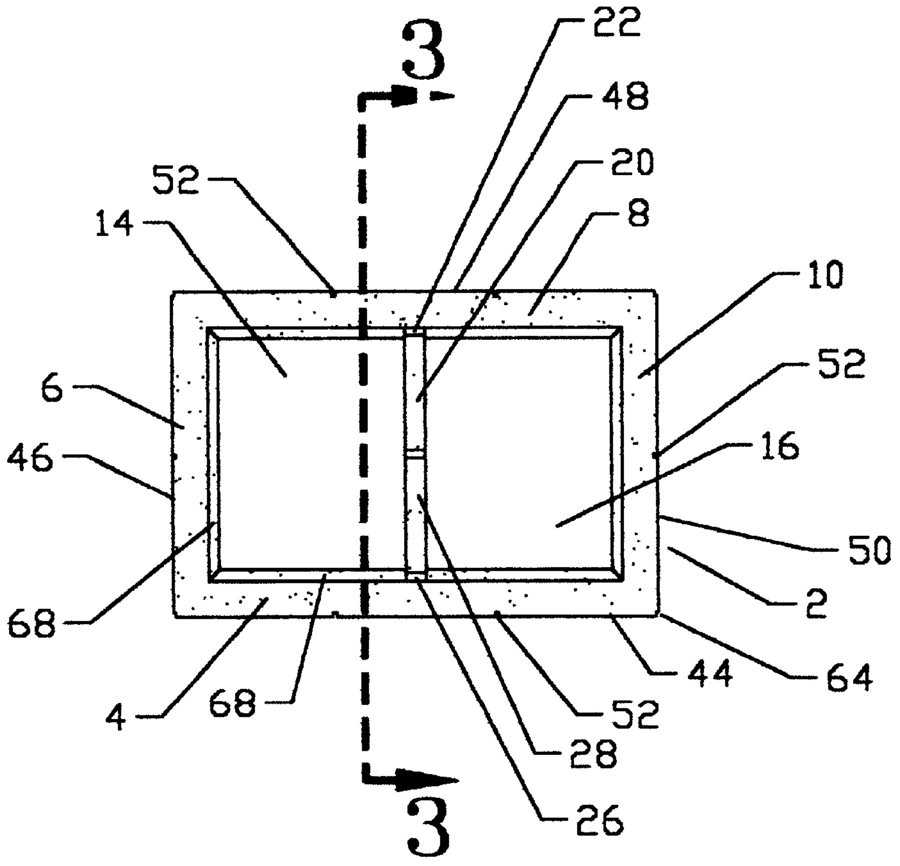
FIG. 2 is a top plan view of the stair block of FIG. 1.
Figure 3:
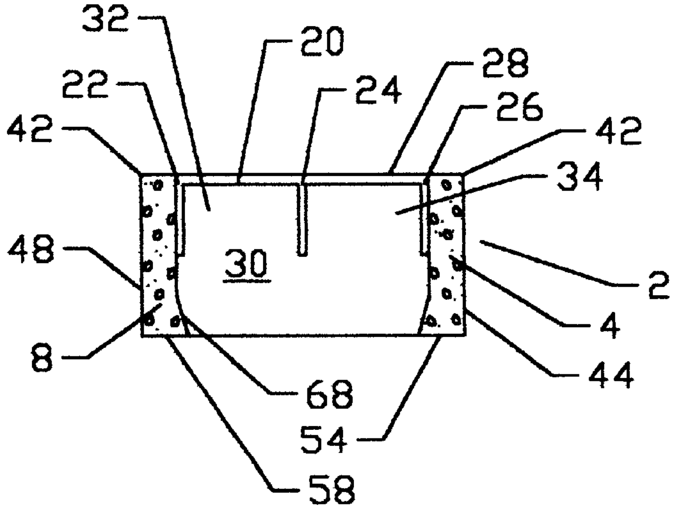
FIG. 3 is a cross section view taken along line 3—3 of FIG. 2.

FIGS. 1, 2, and 3 of the drawings illustrate the preferred embodiment of the invention composite concrete block 2. The block is preferably of rectangular shape having opposing end walls 6 and 10 joined to opposing sidewalls 4, 8, and an open top 12, with sidewalls 4 and 8 being longer than end walls 6 and 10. In the preferred embodiment, sidewalls 4 and 8 are approximately fifty percent longer than end walls 6 and 10. Centrally disposed within block 2 are cavities 14 and 16 which extend from top 12 to the bottom 18 of block 2. Separating cavities 14 and 16 is web 20 which interconnects opposing sidewalls 4 and 8 approximately midway along each. Web 20 is of a thickness substantially less than the thicknesses of front sidewall 4 and rear sidewall 8 and end walls 6 and 10 and is integrally formed with the sidewalls 4, 8 and end walls 6, 10. Web 20 is provided with a plurality of spaced apart generally vertical narrow voids 22, 24, 26 which extend from the top edge 28 of web 20 into the body 30 of web 20. Preferably void 22 is disposed in web 20 at the intersection of web 20 with sidewall 8 and void 26 is disposed at the intersection of void 20 with sidewall 4 while void 24 is disposed substantially equidistant from voids 22 and 26. Preferably web 20 is of the same height as sidewalls 4 and 8 and voids 22, 24, 26 may extend approximately halfway through the body 30 of web 20; however, voids 22, 24, 26 must extend into web 20 at least the height of a paving block, that is approximately 2⅝ inches to 3 inches and preferably 3½ inches. When block 2 is set on a generally level granular base, a user may remove the top segments 32 and 34 of web 20 and may discard the broken pieces thereof into cavities 14 and 16 or otherwise dispose of them. The user then may fill cavities 14 and 16 with granular material in suitable rises to a level below the top 12 of block 2 which allows placement of plural paving blocks on the fill such that the tops of the paving blocks are flush with the top 12 of block 2. The smaller paving blocks may be installed in various patterns as desired by the user.

The exterior vertical surfaces 44 and 48 of sidewalls 4, 8 respectively are provided with narrow vertical indentations or V-shaped grooves 52, preferably visually dividing the outer surfaces 44 and 48 into thirds. The outer surfaces 46 and 50 of end walls 6 and 10 respectively are each similarly provided with at least one vertical indentation or v-shaped groove 52 which is generally equidistant from the ends of the end walls 6, 10 to visually divide end walls 6, 10 into halves. Each groove 52 is approximately one fourth inch on each side. Each vertical corner 60, 61, 62, 63 of block 2 is provided with a small bevel 64 along its length. The grooves 52 blend visually with the seams created by bevels 64 on horizontally adjacent blocks 2.

Referring to FIG. 3, it can be seen that the upper outside corners 42 of sidewalls 4 and 8 are rounded along a radius suitable for a stair, approximately a one half inch radius. It should also be understood that the lower ends 54, 58 of sidewalls 4 and 8 are enlarged slightly and gradually at ramp regions 68 to strengthen the sidewalls 4 and 8 as well as to give a stronger base for resting the block 2 on a pallet during the forming process and to ease the stripping of the block 2 from its mold. Similarly the lower ends 66, 70 of end walls 6 and 10 are also graduated inwardly. The enlargements of lower ends of sidewalls 4, 8, and walls 6, 10 create ramp regions 68 adjoining the cavities 14, 16.

Preferably the length of end walls 6, 10 is nominally 15⅝ inches while the length of side walls 4, 8 is nominally 23⅞ inches. The height of each of end walls 6, 10 and sidewalls 4, 8 is nominally seven inches. Each wall 4, 6, 8, 10 may alternatively be six and three fourth inches high or eight inches high. The thickness of end walls 6, 19 and side walls 4, 8 is nominally one and three fourth inches and each is rounded on a one-half inch radius at its upper corners. Web 20 is nominally one and three sixteenth inches in thickness and extends between sidewalls 4, 8. Voids 22, 24, 26 are each nominally one-fourth inch wide and extend approximately three and one half inches into web 20.

Figure 4:
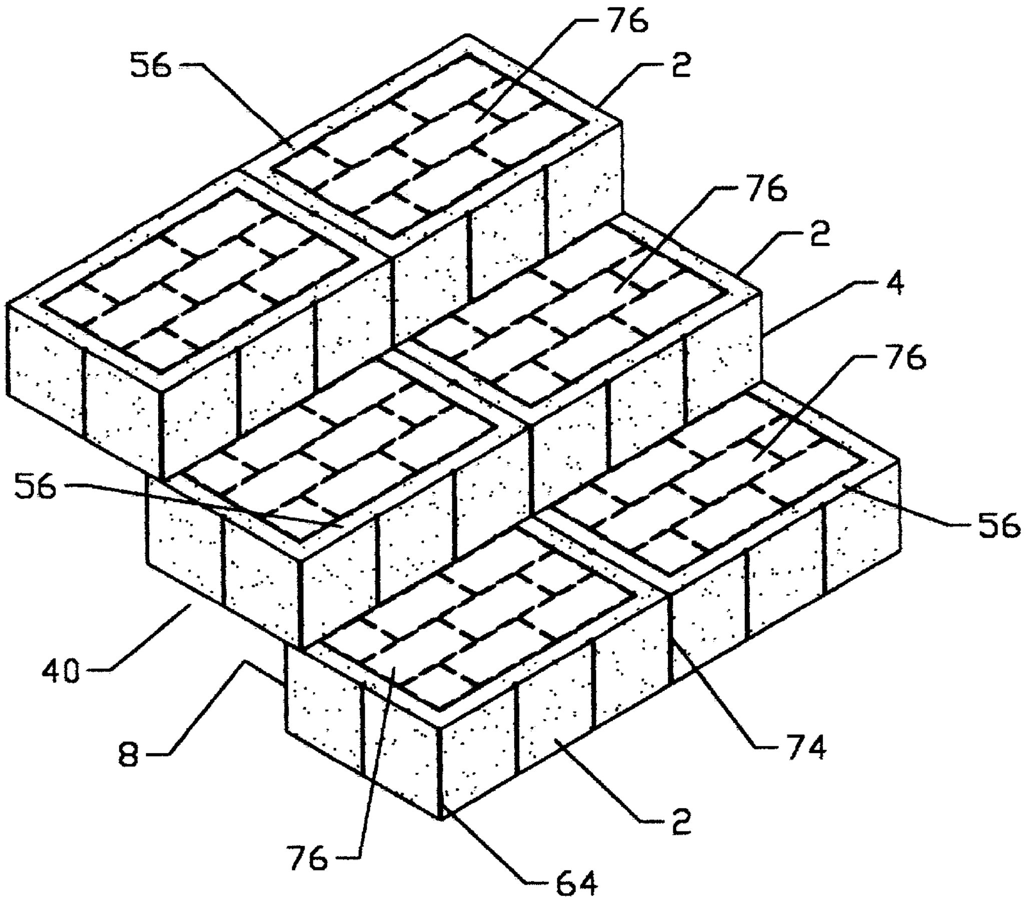
FIG. 4 is a perspective view of a stair constructed with the stair block of FIG. 1 with paving blocks installed therewithin shown by dashed lines.

FIG. 4 depicts a staircase 40 constructed from blocks 2 arranged such that each next higher course of blocks 2 rests with the front sidewalls 4 thereof on the rear sidewalls 8 of the course of blocks 2 below. The rear sidewalls 8 of block 2 rest on grade. Within blocks 2 are installed a plurality of paving blocks 76 in an array which the user finds aesthetically pleasing. The paving blocks 76 are nominally four inches by eight inches in size and approximately two to three inches in height. The paving blocks 76 are placed upon granular material filled in the cavities 14 and 16 of blocks 2 after the top segments 32 and 34 of webs 20 have been removed, typically by blows with a hammer to the vertical faces of top segments 32 and 34. The cavities 14 and 16 of blocks 2 are filled with sand or other granular materials to a level such that the tops of the paving blocks 54 are generally flush with the top edges 56 of blocks 2.

It can also be seen that grooves 52 of front sidewalls 4 of blocks 2 create a uniform appearance when viewed with seams 74 between adjacent blocks 2 in staircase 40.

Figure 5:
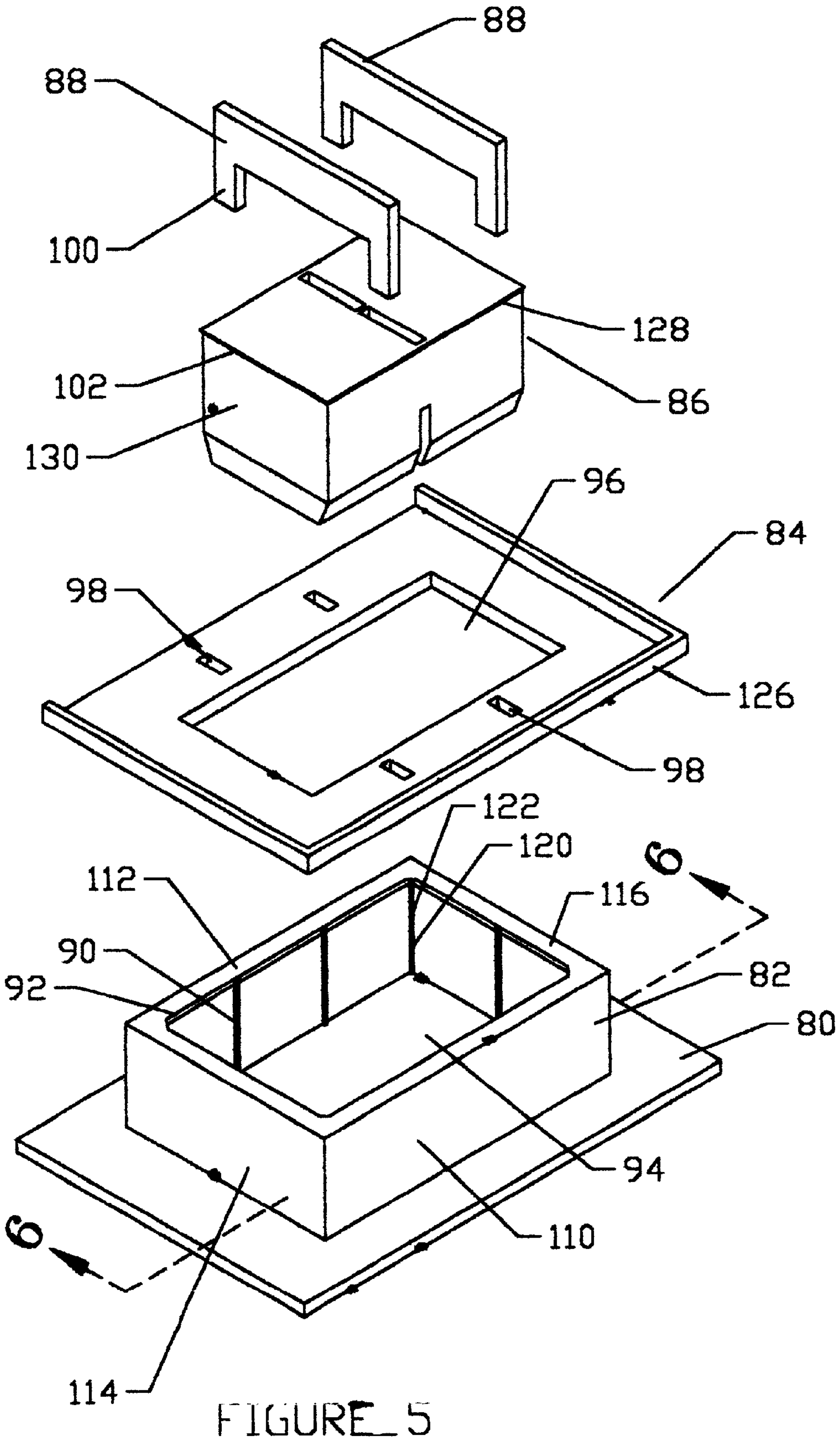
FIG. 5 is an exploded perspective view of an embodiment of the mold for making the block of FIGS. 1, 2, 3.
Figure 6:
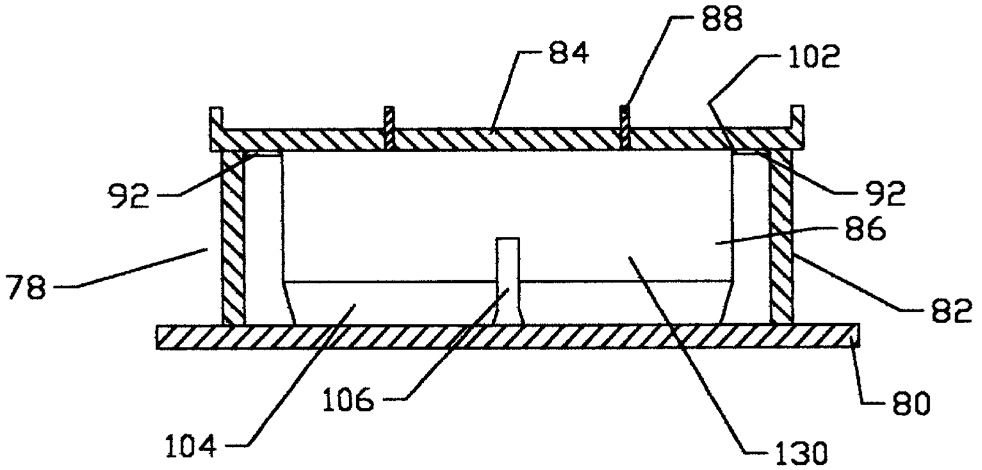
FIG. 6 is a cross section of the mold taken along lines 6—6 of FIG. 5.
Figure 7:
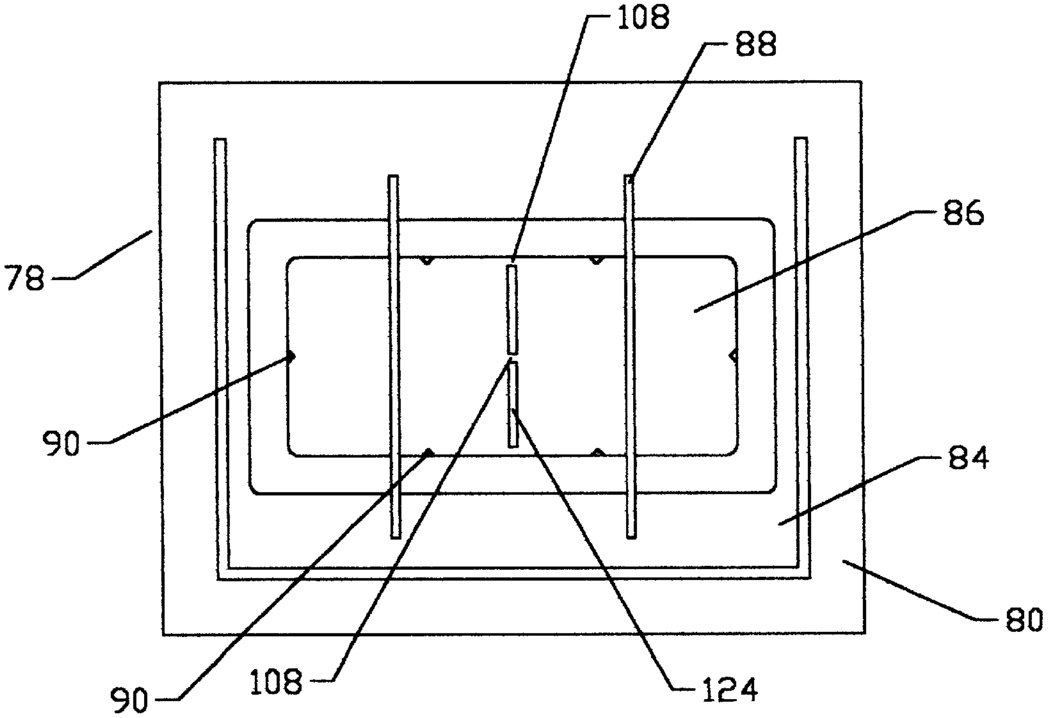
FIG. 7 is a top plan view of the mold of FIG. 5.

FIG. 5, 6, and 7 illustrate a suitable mold 78 for forming the blocks 2 in a block-making machine.

Generally, the process for making this invention includes block molding the composite concrete block by filling a block mold 78 with zero slump concrete mix and casting the block by compressing the mix in the mold through the application of pressure to the exposed mix at the open upper end of the block mold 78. Dyes, colorants, pigments and other additives may be added to the mix depending upon the physical characteristics which are desired in the resulting block.

The fill is then loaded into a hopper which transports the fill to the mold 78 within the block machine. The mold 78 generally comprises at least four sides bordering a central cavity 94. A core member 86 may be placed in the mold cavity 94 prior to loading the mold 78 with block mix. Generally, the core member 86 may be supported by elongate hangers 88 positioned across opposing first 110 and second 112 sidewalls. The mold 78 may comprise any material which will withstand the pressure to be applied to the block fill by the head as is well known in the art.

The walls of the mold box 82 measure the height and width of the resulting blocks. Accordingly, the mold walls must be made of a thickness which will accommodate the processing parameters of block formation given a specific mold composition.

A flat pallet 80 which is vertically displaceable in a conventional block machine is initially seated against the bottom of mold box 82. Mold box 82 comprises a pair of oppositely disposed generally identical mold box side walls 110, 112 connected at their ends by end walls 114, 116. Each mold box wall 110, 112, 114, 116 is equal in height. The in-facing surfaces 118 of walls 110, 112, 114, 116 are each provided with vertically disposed elongate triangular ribs 90 which are spaced generally proportionally along walls 110, 112, 114, and 116. Each rib 90 extends from the top to the bottom of walls 110, 112, 114 and 116. At the interior corners 120 of mold 80 are gussets 122 which serve to create bevels 64 on the corners 60, 61, 62, 63 of a formed block 2. Ribs 90 form the grooves 52 in the surfaces 44, 46, 48 and 50 of block 2.

A surrounding downwardly concave lip 92 slightly overhangs cavity 94 within mold box 82 in order to form a rounded corner on the outside top edges of block 2.

Resting atop mold box 82 is mold top plate 84 which includes a central opening 96 of rectangular shape which coincides with the shape of cavity 94 of mold box 82. A surrounding low barrier 126 is fixed upon the top of mold top plate 84 at three sides of its periphery. Multiple slots 98 are provided through mold top plate 84 to receive tabs 100 of hangers 88.

Hangers 88 are fixedly mounted to core member 86 such that when core member 86 is lowered into cavity 94 of mold box 82, core member 86 is suspended from hangers 88 and disposed generally equidistant on its sides from mold box sidewalls 110, 112, and end walls 114, 116. Hangers 88 rest on mold top plate 84 when tabs 100 are received in slots 98 of mold top plate 84.

Core member 86 is sized such that it may seat on pallet 80 when in place in cavity 96. Core member 86 is provided around its periphery at its upper outer corners 128 with overhanging shelf 102 which forms inside rounded corners on the block 2.

Core member 86 is provided with ramp forms 104 at the lower end thereof which recede at an incline from the generally planar sides 130 of core member 86.

A recess 106 is disposed centrally in core member 86 to permit block mix to enter and form web 20 of block 2.

Bridges 108 extend into recess 106 at the top of core member 86, each bridge 108 extending downwardly about four inches to form voids 22, 24, 26 of web 20 of block 2. Slits 124 in core member 86 are defined by pairs of bridges 108 and provide fill areas for block mix to enter to form the top segments 32, 34 of web 20.

In operation, the mold 78 is generally positioned in a block molding machine atop a removable or slidable pallet 80. The core member 86 is then placed into the mold box 82. The mold 78 is then loaded with block mix or fill.

Zero slump block mix may be introduced from a hopper above mold top plate 84 and enters cavity 94 and slits 124. The mold 78 is agitated vigorously for a brief period after which a scraper (not shown) is drawn across mold top plate 84 to remove excess fill. A conventional stripper head (not shown) is depressed upon the opening 96 of mold top plate 84 to compress the block mix within the mold 78. Preferably the head is patterned to avoid the support hangers 88 and core member 86. Thereafter, the stripper head further depresses as the pallet 80 is lowered from beneath the mold box 82 as the molded block 2 is stripped from the mold 78. The ramp forms 104 facilitate stripping of the block 2 from the mold 78 and strengthen the sidewalls 4, 8 and end walls 6, 10 of block 2 as pressure is exerted on the block mix while in the mold.

Once the blocks are formed, they may be cured through any means known to those of skill in the art. Curing mechanisms such as simple air curing, autoclaving, steam curing or mist curing, are all useful methods of curing the block of the present invention. A preferable means for curing blocks is by steam. The chamber temperature is slowly increased over two or three hours and then stabilized. The steam is gradually discontinued and the blocks are held at the eventual temperature, generally around 100–130 degrees F. for two to three hours. The heat is then turned off and the blocks are allowed to cool. In all instances, the blocks are generally allowed to sit for at least twenty-four hours before being stacked or stored.

Having described the invention, I claim:

1. A method for constructing a block for use as a stair component in landscaping applications comprising:

filling an open ended form with zero slump block mix to create an open block, the form having outer walls and a centrally disposed core member spaced apart from said outer walls, said outer walls and said core member cooperating to define a mold cavity, each of said outer walls having a lower end and an upper end, said lower ends defining a common plane, said upper ends defining a common plane, said core member having a top surface and a bottom surface, said bottom surface coplanar with said lower end of said outer walls, the top surface of the core member coplanar with the upper ends of said outer walls, drawing excess block mix from said top of said open ended form;

agitating said filled form, compressing said block mix by movement of a compression head through said mold cavity, transferring said compressed block mix from said form to a pallet by moving said compression head through said mold cavity, curing said formed block in a moisturizing kiln.

2. The method of claim 1 wherein said core member has generally vertical sidewalls, at least one of said sidewalls having a lower inclined region thereon, the lower inclined region having a lower edge coextensive with said bottom surface of said core member, said inclined region receding from an opposing one of said outer walls of said form.

3. The method of claim 2 wherein said core member is substantially equidistant from each of said outer walls.

4. The method of claim 3 wherein, each of said outer walls of said form has an upper end, the upper end of each of said outer walls having a generally horizontal lip extending therefrom toward said core member.

5. The method of claim 4 wherein the lip of each of said outer walls has a concave underside.

6. The method of claim 5 wherein said top surface of said core member has a shelf laterally depending therefrom about its periphery, said shelf having a concave underside.

7. The method of claim 1 wherein the upper end of at least one of said outer walls has a generally horizontal lip extending therefrom toward said core member.

8. The method of claim 7 wherein the lip of said at least one outer wall has a concave underside.

9. The method of claim 1 wherein said top surface of said core member has a shelf laterally extending therefrom about its periphery.

10. The method of claim 1 wherein said core member is substantially equidistant from each of said outer walls, said core member having generally vertical sidewalls, at least one opposing pair of said sidewalls having lower inclined regions thereon, each of the lower inclined regions having a lower edge coextensive with said bottom surface of said core member, said inclined regions receding from opposing ones of said outer walls of said form.

11. The method of claim 10 wherein each of said sidewalls of said core member has a lower inclined region thereon, each of said lower inclined regions having a lower edge coextensive with said bottom surface of said core member, each of said lower inclined regions receding from an opposing one on said outer walls of said form.

12. The method of claim 11 wherein each of said outer walls of said form has an upper end, each upper end of said outer walls having a generally horizontal lip extending therefrom toward said core member, each lip of said outer walls having a concave underside, said top surface of said core member having a shelf laterally extending therefrom about its periphery, said shelf having a concave underside.

13. The method of claim 12 wherein said core member has a vertically oriented central void therein, said central void extending from said bottom surface of said core member, said central void extending from one of said sidewalls to the opposing one of said sidewalls.

14. The method of claim 13 wherein said core member has at least one blade member extending vertically into said central void from the top surface of said core member.

15. The method of claim 14 wherein said core member has at least one gap in the top surface thereof, said gap coplanar with said central void.

16. The method of claim 1 wherein said core member is substantially equidistant from each of said outer walls, said core member having generally vertical sidewalls, said core member has a vertically oriented central void therein, said central void extending partially through said core member from said bottom surface of said core member, said central void extending from one of said sidewalls to the opposing one of said sidewalls, said core member has at least one slit in the top surface thereof, said at least one slit communicative with said central void, the method further comprising the step of filling the central void of the core member through the at least one slit before agitating said form.

17. The method of claim 1 wherein the step of curing the formed block in a moisturizing kiln comprises the steps of:

placing the form block in a kiln enclosure, raising the temperature in the kiln enclosure by injecting steam thereinto over a period of approximately two to three hours, maintaining the temperature in the kiln at approximately 100 to 120 degrees Fahrenheit for approximately two to three hours, reducing the temperature in the kiln gradually to ambient temperature.

18. A method of using a masonry block mold to form a masonry stair block having opposing sides connected by end sides, the sides surrounding a void and having a centrally located web interconnecting said opposing sides, the mold comprising a pair of opposed side walls connected by end walls and including a core member, the mold having a fill-receiving cavity defined therein having an open top and bottom, each side wall and each end wall of said mold comprising a bottom end and a top end, said bottom ends adapted to seat on a generally horizontal pallet, said core member comprising a top surface and a bottom surface, the bottom surface adapted to seat on the generally horizontal pallet, said bottom surface coplanar with said lower ends of the side walls and the end walls of the mold, the core member comprising a vertically oriented recess extending from the bottom surface thereof, said top surface of the core member generally coplanar with said top ends of the opposed side walls, said method comprising the steps of:

filling the mold with zero slump block mix through the top of the cavity while filling the recess of the core member with zero slump block mix;

agitating the filled mold including the filled recess;

compressing the block mix within said mold with a stripper head moving into the cavity from the open top thereof;

stripping the formed stair block from the mold onto the pallet by moving the stripper head through the mold cavity while lowering the pallet from the mold;

curing the formed stair block in a moisturizing kiln.

19. The method of claim 18 wherein the core member comprises at least one slit in the top surface thereof, the slit communicative with the recess of the core member, the method further comprising the step of filling the recess in the mold through the at least one slit.

20. The method of claim 18 wherein the core member is generally rectangular having four generally upright sidewalls, each sidewall having a lower ramp segment, each lower ramp segment receding inwardly as said lower ramp segment approaches the bottom surface of the core member, the method further comprising the step of facilitating stripping of the formed stair block from the mold past the ramp segments of the core member.

21. The method of claim 18 further comprising the step of:

forming at least one vertical groove on at least one outside face of the stair block by use of a triangular rib fixed to an inside face of at least one of the outer walls of the form.

22. A method for constructing a block for use as a stair component in landscaping applications comprising placing a generally rectangular open ended form having four orthogonal sides on a substantially flat pallet, the open ended form having a top, forming a core member having a bottom, the core member having a vertically disposed central recess therein extending upward partly therethrough from the bottom thereof, suspending the core member within the open form such that the core member is substantially equidistant from the sides of the form, the core member and the open ended form defining a mold cavity, filling the open form and the central recess with zero slump block mix, agitating the mold cavity to compress the block mix therein, further compressing the block mix by movement of a stripper head through said mold cavity, transferring said compressed block mix from said form by use of said stripper head to place said formed block mix on the pallet, curing said formed block mix in a moisturizing kiln.

23. The method of claim 22 wherein the curing step comprises the steps of:

placing the block mix in an enclosed chamber, raising the temperature in the chamber by use of steam, maintaining the temperature in the chamber for approximately two to four hours in the range of approximately 100 to 120 degrees Fahrenheit.

24. The method of claim 22 wherein the core member has a top surface and the core member has at least one slit in the top thereof, further comprising the step of filling the recess of the core member through the at least one slit before agitating the mold cavity.

25. A method of using a masonry block mold to form a masonry stair block having four sidewalls surrounding a central rectangular void, the block having an open top and an open bottom, said mold comprising a pair of opposed walls connected by end walls, the opposed walls and the end walls defining a central cavity, said mold including a core member, the core member suspended within the central cavity of the mold substantially equidistant from each of said walls thereof, said walls and said core member defining a fill-receiving cavity within the mold, the fill-receiving cavity having an open top and bottom, each opposed wall and each end wall of said mold comprising a bottom end and a top end, said bottom ends adapted to seat on a generally horizontal pallet, said core member comprising a top surface and a bottom surface, the bottom surface adapted to seat on the generally horizontal pallet, said bottom surface coplanar with said lower ends of the opposed walls and the end walls of the mold, said top surface of the core member generally coplanar with said top ends of the opposed walls, said method comprising the steps of:

filling the fill-receiving cavity with zero slump block mix through the top of the fill-receiving cavity;

agitating the filled mold;

compressing the block mix within said mold with a stripper head moving into the cavity from the open top thereof;

stripping the formed stair block from the mold onto the pallet by moving the stripper head through the mold cavity while lowering the pallet from the mold;

curing the formed stair block in a moisturizing kiln.

26. The method of claim 25 wherein the core member comprises a vertically oriented recess extending from the bottom surface thereof, the recess extending through the width of the core member, further including the step of filling the vertically oriented recess with zero slump block mix before agitating the filled mold.

27. The method of claim 26 wherein the core member comprises at least one slit in the top surface thereof, the slit communicative with the recess of the core member, further comprising the step of filling the recess with block mix through the at least one slit.

* * * * *